United States Patent [19]
Stilger et al.

[11] Patent Number: 5,637,283
[45] Date of Patent: Jun. 10, 1997

[54] METHOD AND AFTERBURNER APPARATUS FOR CONTROL OF HIGHLY VARIABLE FLOWS

[75] Inventors: John D. Stilger; Richard J. Martin, both of San Jose; Mark R. Holst, Concord; Samson C. Yee, Fremont, all of Calif.

[73] Assignee: Thermatrix, Inc., San Jose, Calif.

[21] Appl. No.: 468,872

[22] Filed: Jun. 6, 1995

Related U.S. Application Data

[62] Division of Ser. No. 426,641, Apr. 21, 1995, which is a continuation of Ser. No. 92,980, Jul. 16, 1993.

[51] Int. Cl.$^6$ .................................................... C07C 11/24
[52] U.S. Cl. ........................................................ 423/245.1
[58] Field of Search ............................ 423/240 R, 245.1, 423/245.3

[56] References Cited

U.S. PATENT DOCUMENTS

| | | | |
|---|---|---|---|
| 3,109,715 | 11/1963 | Johnson et al. | 423/202 |
| 3,297,400 | 1/1967 | Eastwood | 422/171 X |
| 3,455,089 | 7/1969 | Mattia | 423/245.3 X |
| 3,657,892 | 4/1972 | Perga et al. | 422/171 X |
| 3,718,440 | 2/1973 | Foster-Pegg | 423/245.3 X |
| 3,791,143 | 2/1974 | Keith et al. | 422/171 X |
| 3,954,418 | 5/1976 | Slopmont | 422/115 |
| 3,999,936 | 12/1976 | Hasselmann | 431/202 |
| 4,058,147 | 11/1977 | Stary et al. | 141/45 |
| 4,108,113 | 8/1978 | Timm et al. | 423/245.3 X |
| 4,134,271 | 1/1979 | Datis | 62/54 |
| 4,688,495 | 8/1987 | Galloway | 110/250 |
| 4,823,711 | 4/1989 | Kroneberger et al. | 110/236 |
| 4,907,964 | 3/1990 | Howarth et al. | 431/202 |
| 4,983,364 | 1/1991 | Buck et al. | 422/189 |
| 4,985,210 | 1/1991 | Minami | 422/171 X |
| 5,050,603 | 9/1991 | Stokes et al. | 123/523 |
| 5,165,884 | 11/1992 | Martin et al. | 431/7 |
| 5,182,086 | 1/1993 | Henderson | 423/245.3 X |
| 5,291,859 | 3/1994 | Brinck et al. | 122/7 |
| 5,295,448 | 3/1994 | Vickery | 110/214 |
| 5,344,313 | 9/1994 | Johnsen, Jr. | 431/346 |

OTHER PUBLICATIONS

*Webster's II New Riverside Dictionary,* 1994, p. 798.
*The Condensed Chemical Dictionary,* 8th edition. Van Nostrand Reinhold Company, New York, p. 33.

*Primary Examiner*—Deborah Jones
*Assistant Examiner*—Amy M. Harding
*Attorney, Agent, or Firm*—Woodcock Washburn Kurtz Mackiewicz & Norris LLP

[57] ABSTRACT

Methods and apparatus are provided for destruction of volatile organic compounds ("VOC's") from process fumes having variable amounts of such VOC's wherein a nominal amount of the fumes are passed through an oxidizer for destruction of the VOC's and the hot products from the oxidizer are fed to an afterburner that is principally made up of a matrix bed of heat resistant material. The heat from the oxidized gases heats the matrix bed. Fume flows exceeding the nominal flow are bypassed directly to an inlet port of the afterburner where they are passed through the matrix bed of the afterburner, which has been heated by the oxidized gases from the oxidizer, and are combusted into additional gaseous products in a combustion wave. The system allows for utilization of the heat produced from the oxidation of the nominal flow for destructing fume flows that exceed the nominal flow.

19 Claims, 4 Drawing Sheets

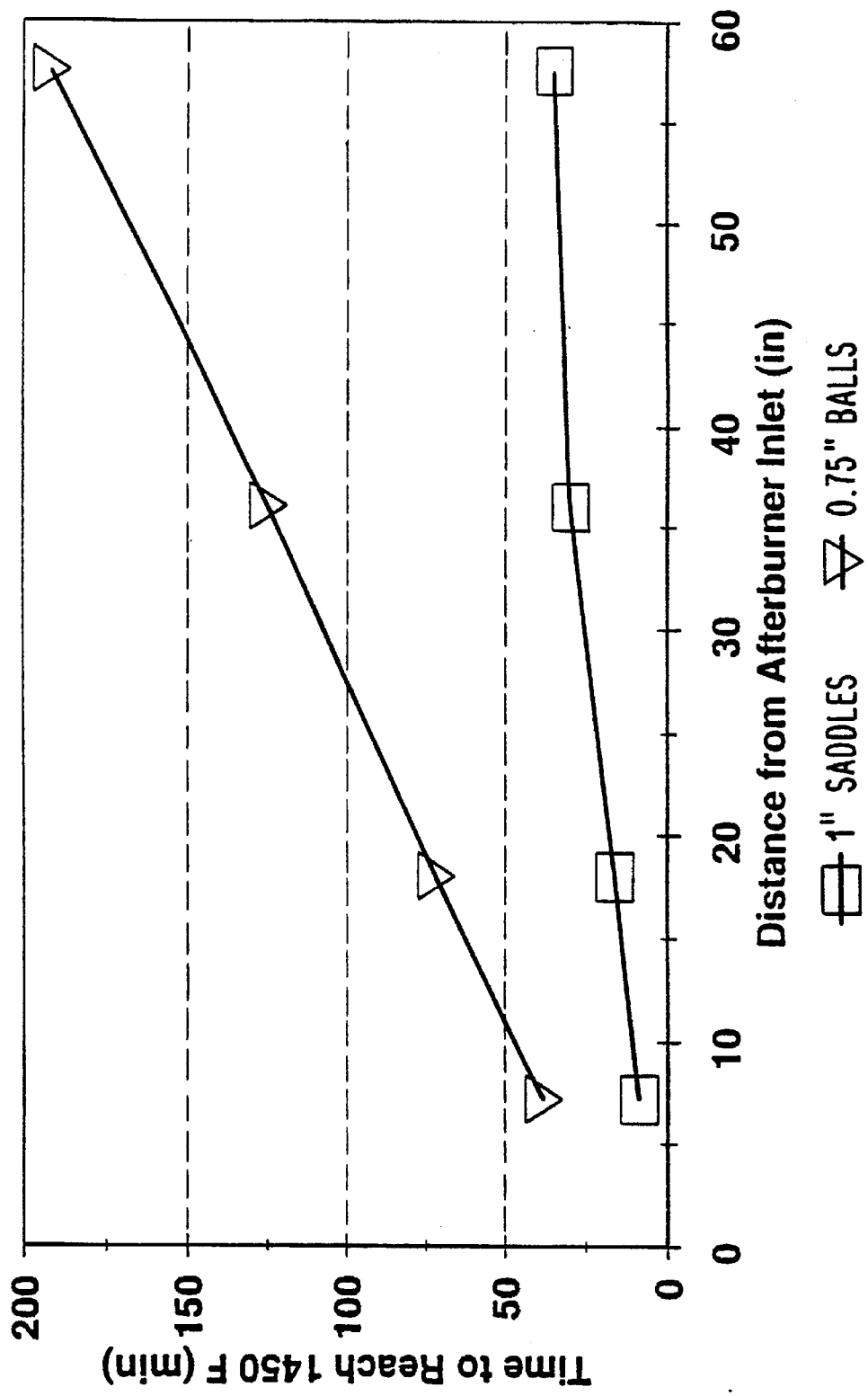

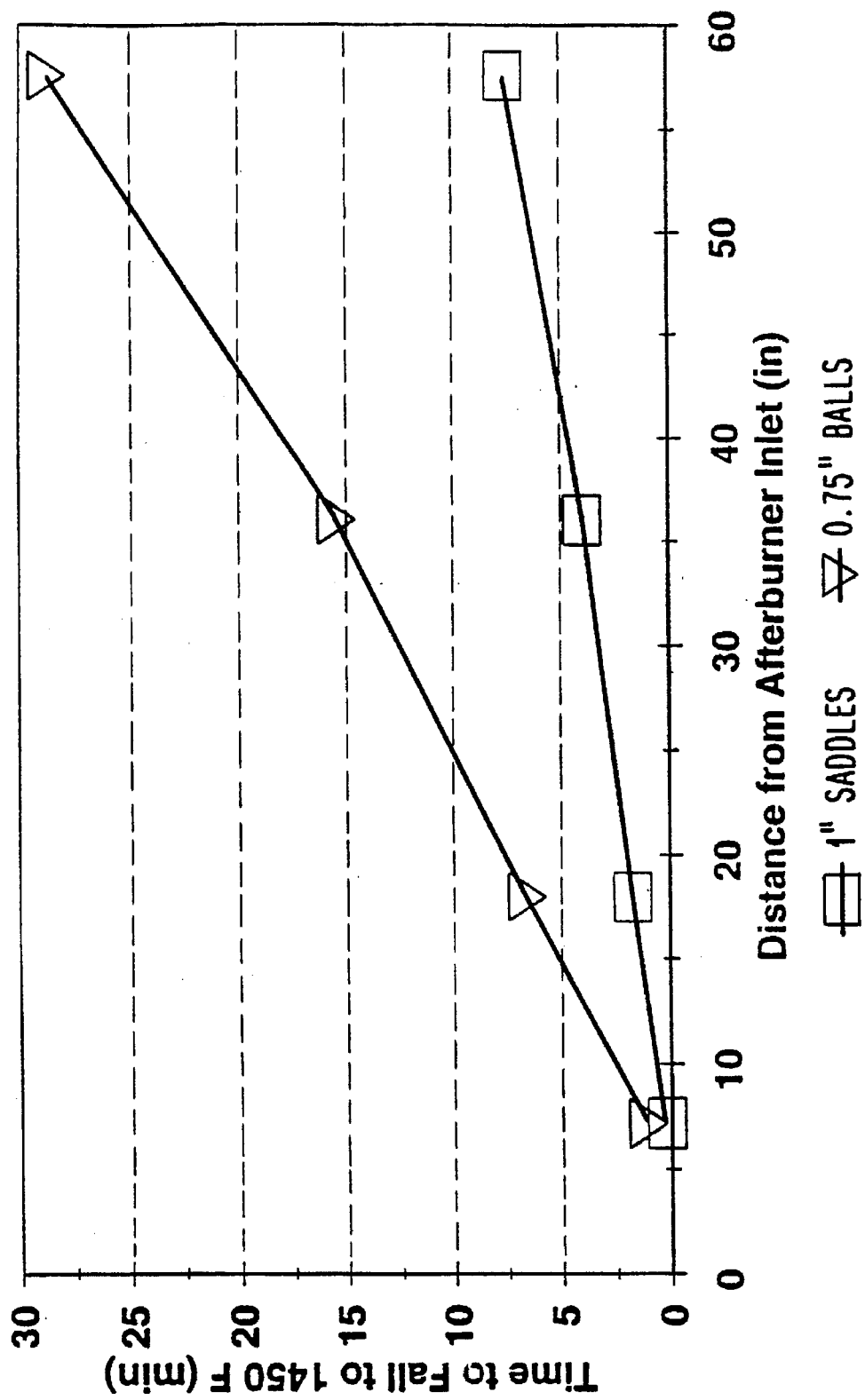

METHOD AND AFTERBURNER APPARATUS FOR CONTROL OF HIGHLY VARIABLE FLOWS

This is a division, of application Ser. No. 08/426,641, filed Apr. 21, 1995, which is a Rule 1.62 continuation of Ser. No. 08/092,980, filed on Jul. 16, 1993.

FIELD OF THE INVENTION

The field of the present invention is methods and apparatus for the destruction or abatement of Volatile Organic Compound (VOC)-containing process fumes. In particular, the present invention is directed to providing for increased system cost effectiveness in situations where batch processing or fume flows with cyclical or variable heat content or flow rate may be present.

BACKGROUND OF THE INVENTION

In a number of industries, and in particular the pharmaceutical industry, processes are used that generate fume streams that are either batched or highly cyclical. Often, these fume streams may vary with time in either flow rate, composition, concentration, or in any combination thereof. A depiction of the fume flow rate profile versus time may show a relatively short time duration of very high or rich flow, a period where the fume flow rate rapidly drops off, and a long period of relatively low flow rate. This flow rate profile may then repeat itself indefinitely.

Regional, state, or federal air pollution regulations often require that such fumes be abated, but dealing with the cyclical, highly variable fume profiles poses a particularly difficult problem when designing an abatement system. A conventional thermal oxidation system, designed for the low flow or "nominal" condition, will be overwhelmed during a high flow condition. During periods of high flow, the system will perform poorly, for example achieving poor destruction and removal efficiency (DRE), while leaving a high CO content and high formation of products of incomplete combustion (PIC's). Even though the duration of these high flow periods is short, the large quantities of unoxidized VOC's or PIC's can completely offset the long periods of good system performance to produce a system with overall poor performance.

On the other hand, if a conventional thermal oxidation system is designed for a high flow condition, then the oxidizer will operate with acceptable environmental performance at all times. The problem with designing for the high flow condition is that, during the long periods of low flow, large quantities of supplemental fuel will have to be burned to keep the system on line due to the limited turndown of the thermal oxidizer. This high fuel consumption will also lead to detrimental $NO_x$ generation.

Often, if the system is designed for the high flow condition, the thermal oxidizer may require additional oversizing to prevent flameout during those periods of dramatic flow fluctuation when fume flow either dramatically increases, or dramatically decreases. This oversizing may be such as to allow three to ten times the flow that is required to oxidize even the maximum flow case. Such design choices dramatically affect the overall system size, cost, and thermal efficiency.

These problems, or other similar problems, apply to any of the conventional abatement alternatives currently available, including incineration, thermal oxidation, regenerative thermal oxidation, recuperative thermal oxidation, and catalytic oxidation.

Another abatement alternative is to use a porous inert matrix thermal oxidizer such as is described in U.S. Pat. No. 5,165,884 (Martin et al.). This is much better than the conventional abatement alternatives because the processor need be sized for no larger than the maximum flow condition and the thermal mass of the matrix can actually be utilized, resulting in a unit that can be sized for smaller than the maximum case. In such a design, during over-design-flow cases, the process operates in an off-equilibrium condition, but the thermal mass of the matrix dampens the effect of the flow fluctuations until the fluctuation passes and the control system brings the processor back into equilibrium.

Even the porous inert matrix thermal oxidizer system has some limitations. Sometimes the high fume flow case is so much larger than the nominal flow that excessive system pressure drops may be produced (in adherence to the Bernoulli equation, which states that pressure drop varies proportionately with velocity squared).

At other times, the high fume flow case is of such duration that a small sized processor would experience "thermal breakthrough" before the flow drops back to the nominal flow and allows reestablishment of the equilibrium condition. Thermal breakthrough occurs when the flow is high enough for a long enough time period that the reaction wave migrates out of the matrix entirely, leaving behind it only cold matrix. The simple solution to this problem is to install a processor that is larger, but still not as large as a processor sized for the maximum flow condition. However, this generates additional costs since the processor size increase will also necessitate a preheater system size (and cost) increase, as well as other modifications of the overall system.

This can be especially problematic when a preheating system is preferred that may possess certain inherent performance advantages, but which may possess an escalated level of cost. For example, an electrical supplemental heating system may be desirable for its ease of utility installation, excellent environmental performance at all times, and heightened safety features. However, the electric preheat package is typically more costly than an all-gas preheat package, and electricity consumption is typically three times as costly as natural gas consumption. Therefore, a relatively small increase in processor size could cause an inordinate increase in preheat capital and operating cost for such a system.

It can be seen that there is a need for a method and apparatus that will achieve adequate DRE's of VOC-containing process fumes that is capable of efficiently handling large variations in fume flow rates. In particular, there is a need for a system that can handle batch processes and processes having cyclical heat content or fume flow profiles.

SUMMARY OF THE INVENTION

The present invention is directed to a method and apparatus for effective destruction and removal of VOC-containing process fumes that is capable of efficiently handling large variations in fume flow rates. To this end, an afterburner chamber filled with matrix media is provided on the downstream end of a thermal processor. This afterburner will typically consist of a refractory-lined containment shell filled with matrix media, and will have a means of entrance and egress and some temperature sensing means to shut the system down in the event of thermal breakthrough. By combining a small scale front end primary thermal oxidizer with such an uncomplicated afterburner, the costs associated with a large scale, front end, primary thermal oxidizer can be avoided. Further, there is inherent safety in the use of a process in which there are no open flames. Flameouts and other flame stability problems are avoided.

Accordingly, it is an object of the present invention to provide a method and apparatus for the minimization of VOC's and of $NO_x$ combustion by-products of VOC abatement to levels equal to or below those achievable by conventional abatement technologies in a cost efficient manner.

Other and further objects and advantages will appear hereinafter.

BRIEF DESCRIPTION OF THE DRAWINGS

FIG. 3 plots the time/distance relationship for a typical combustion temperature using two different matrix materials within an afterburner during heat up in accordance with the present invention.

FIG. 4 plots the time/distance relationship for a typical combustion temperature using two different matrix materials within an afterburner during cool down in accordance with the present invention.

DESCRIPTION OF THE PREFERRED EMBODIMENTS

Significant research into the phenomena of combustion within porous inert media (PIM) has recently been undertaken. Because PIM combustion can occur outside the normal premixed fueled/air flammability limits, the technology can be called "flameless." In this regard U.S. Pat. Nos. 4,688,495 (Galloway) and 4,823,711 (Kroneberger et al.) disclose early work on matrix combustion technology. In addition, U.S. Pat. No. 5,165,884 (Martin et al.), along with presently pending application Ser. No. 07/945,218 (Stilger et al.), filed Sep. 15, 1992, discuss in significant detail the technology involved in a flameless combustor. The issued Martin et al. patent, along with the Galloway and Kroneberger et al. patents are hereby incorporated herein by reference.

Figure 1:
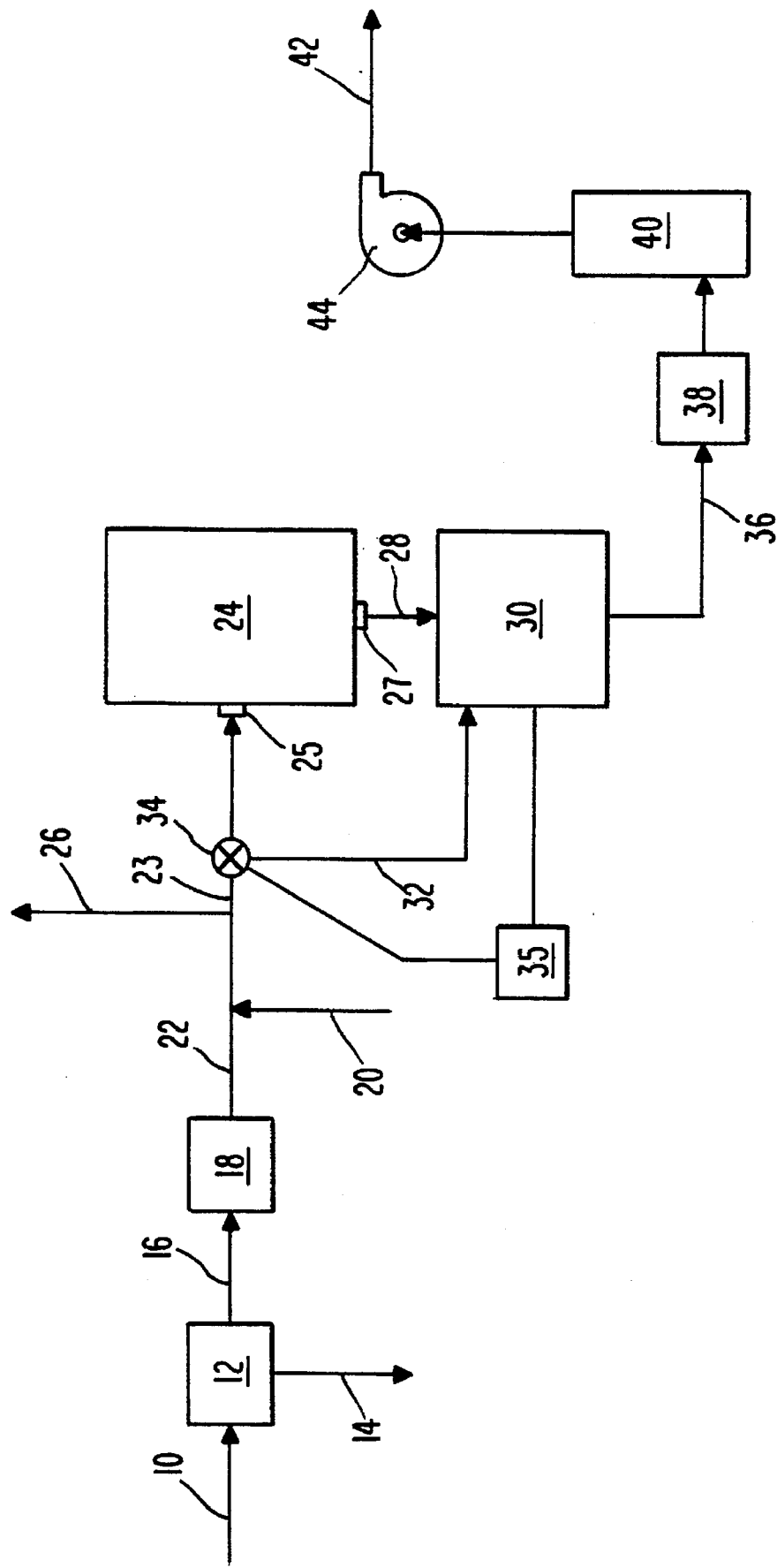
FIG. 1 is a schematic depiction of a system employing the apparatus and methods of the present invention.

Turning in detail to the drawings, where like numbers designate like components, FIG. 1 illustrates schematically a preferred embodiment of the present invention utilizing an afterburner for control of highly variable fume flow rates. A fume flow (10) is delivered from the general process stream into a knockout pot (12). The knockout pot (12) removes liquid carryover and condensation in the fume stream via liquid drain (14). After the knockout pot (12) has removed any residual liquid, the gaseous VOC stream (16) is preferably passed through a flame arrestor (18). The flame arrestor (18) serves as a passive safety, backup device to preclude any flashback from the downstream components into the upstream system.

While the knock-out pot (12) and the flame arrestor (18) are presented in this embodiment, neither is necessary fox general operation of the present invention. For example, not all streams with which the present invention may be used will. require removal of condensation.

After passing through the flame arrestor (18), the gaseous VOC stream, with the possible addition of supplemental dilution air (20) to form fume stream (22), passes to an oxidizer (24) through pipe (23) and inlet (25). The stream (22) is also preferably provided with an emergency vent (26). The oxidizer (24) can be any oxidation device producing a hot exhaust stream, such as a conventional flamed thermal oxidizer, a catalytic oxidizer, etc. In a preferred embodiment, however, this oxidizer (24) is a porous inert media matrix thermal oxidizer, which is either electric or fuel-fired, of the general kind discussed in the incorporated by reference U.S. Pat. No. 5,165,884 (Martin et al.) and the pending application Ser. No. 07/945,218 (Stilger et al.).

Upon entering the oxidizer (24), the VOC emissions in the stream will typically be raised to oxidation temperatures for a sufficient resident time to ensure substantially complete destruction during normal operation. The hot exhaust stream leaves oxidizer (24) through outlet (27) and passes in duct (28) from the oxidizer (24) to an afterburner (30). A bypass (32) is also provided connecting stream (22) directly to the afterburner (30) through control valve (34). A control device (35) can be provided that is connected to sensors within the afterburner (30) and acts to control the control valve (34).

Once the hot oxidized gases (36) exit the afterburner (30), and if there is a need to reduce the temperature of the combustion products to meet safety codes or otherwise, the gaseous products stream are preferably passed through a water quench (38) and then are preferably passed through an acid gas scrubber (40), if necessary. The cleaned exhaust gas (42) is then preferably passed out of the system using an induced draft fan (44) that maintains a slight vacuum on the entire system.

Figure 2:
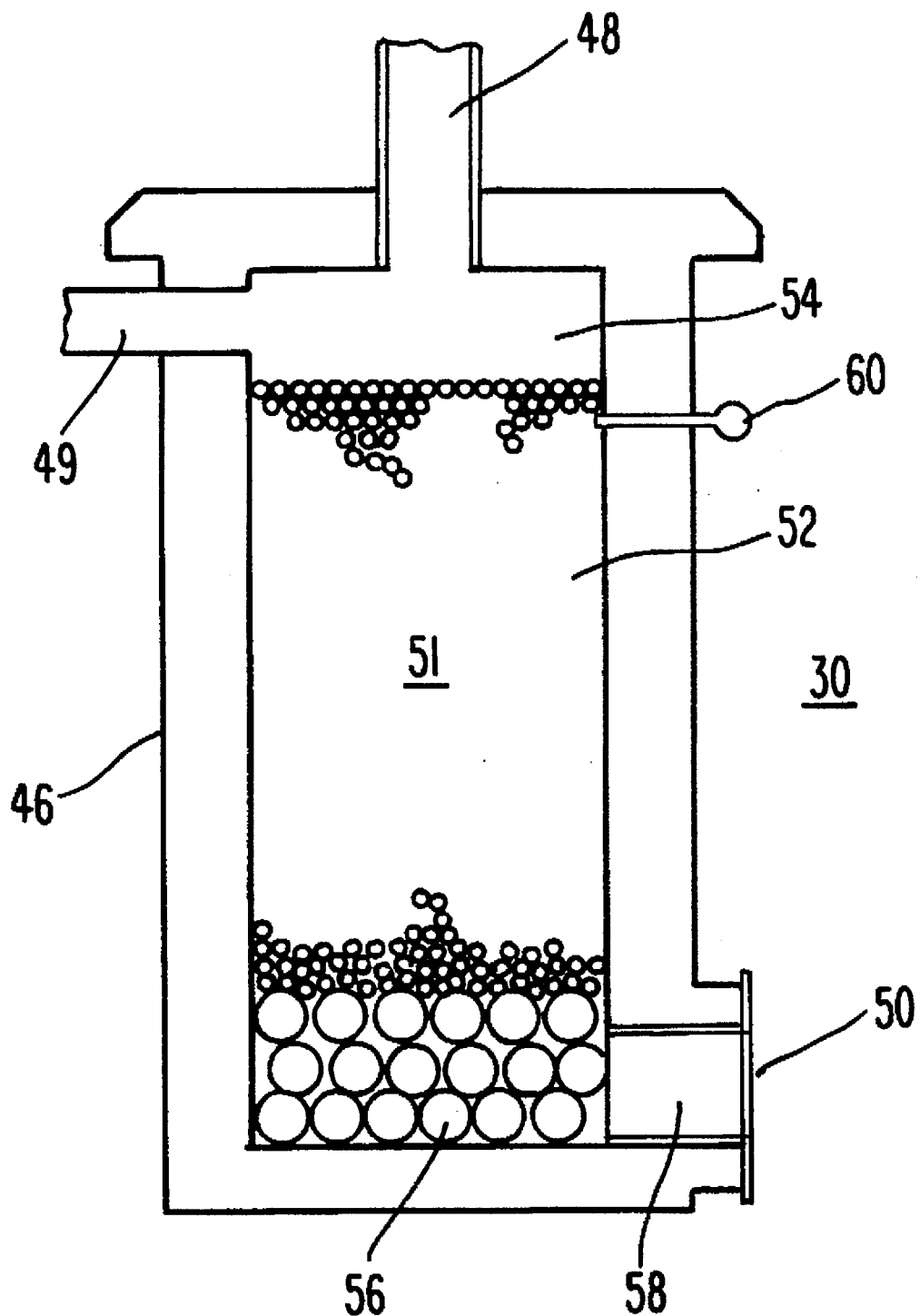
FIG. 2 is a cross-sectional schematic of an embodiment of the afterburner of the present invention.

FIG. 2 illustrates one embodiment of an afterburner (30) of the type used as shown in FIG. 1. The afterburner (30) preferably consists of a refractory-lined carbon steel chamber (46) with ports (48) and (50). An additional port (49) may be present in certain instances. The chamber (46) may also have a corrosion-resistant lining if required for the fume stream.

A majority of the chamber (46) is preferably filled with inert ceramic material (51) making up a destruction matrix (52). The inert ceramic materials (51) enhance process mixing and provide thermal inertia for process stability. Such a destruction matrix (52) is designed to produce DRE's of greater than 99.99%, with less than 10 ppm V CO and less than 2 ppm V $NO_x$.

The types of matrix materials (51) used should have high heat conductance by radiation, convection, and conduction. The heat transfer properties of the system are also dependent on the ratio of radiative to convective heat-transfer. The destruction matrix (52) is designed to provide for maximum heat retention capability while producing minimum differential pressure drop at the maximum flow condition.

The destruction matrix (52) may be sized for any desired flow stream by altering the matrix flow cross-section, height, material, void fraction, outlet temperature, and supplemental heat addition, if desired. Preferred matrix materials (51) are ceramic balls, but other bed materials and configurations may be used, including, but not limited to, other random ceramic packings such as saddles or pall rings, structured ceramic packing, ceramic or metal foam, metal or ceramic wool and the like. It is also possible that the material includes a catalyst.

Generally, for combustion of hydrocarbon gases, the ceramic balls are useful if they have a diameter from about 0.0625 to 3 inches (0.159–7.62 cm), preferably about ¾ inch (1.9 cm). Another useful configuration is the use of random ceramic saddles typically from 0.0625 to 3 inch (0.159–7.62 cm) nominal size, preferably about ½ to 1.5 inches (1.27–3.81 cm) nominal size. Other useful packing materials are pall rings and rashig rings with diameters from about 0.0625 to 3 inches (0.159–7.62 cm), and preferably from about 0.5 to 1.5 inches (1.27–3.81 cm).

A ceramic foam material may also be utilized. Typical foam material may be utilized that has a void fraction of 10 to 99%, preferably 75 to 95%, and most preferably about 90%. The pore sizes in any preferred ceramic foam material will be about 0.1 to 1,000 pores per inch (0.04 to 400 pores per cm), preferably about 1 to 100 pores per inch (0.4 to 40 pores per cm), and most preferably about 10 to 30 pores per inch (4 to 12 pores per cm).

Other shapes of ceramic material may be utilized such as honeycomb shape ceramic. Instead of a ceramic, the heat-resistant matter used to form the bed may also be a metal, which may be randomly packed or may have a structured packing.

Generally, the void fraction of the destruction matrix (52) will be between 0.3 and 0.9. In addition, the material in the destruction matrix will typically have a specific surface area ranging from 40 $m^2/m^3$ to 1040 $m^2/m^3$.

Within the chamber (46) and above the destruction matrix (52), there will preferably be an overhead void (54). There will also typically, but not necessarily, be a plenum (56), preferably made of a heat-resistant material such as one or more layers of different depths comprising larger diameter ceramic balls or a perforated plate, at the bottom of the destruction matrix (52) to prevent the heat resistant material (51) from entering the piping below the destruction matrix (52). If the flow pattern is set up such that the fumes enter the afterburner (30) at the bottom through port (50), this plenum (56) will act to evenly distribute incoming gases and further mix these gases prior to entering the destruction matrix (52). It is believed that this helps to achieve a relatively flat cross-sectional profile of the combustion wave perpendicular to the direction of the flow of the gases through the destruction matrix (52). In some instances, the plenum (56) may be desirable to achieve the flatness of the cross-section of the wave, depending on the configuration of the destruction matrix (52).

If the flow pattern is set up such that the fumes enter the afterburner (30) at the top in either a combined fashion through port (48) or separately through ports (48) and (49), the plenum function of distributing the gases will be achieved through the use of the void space (54) over the top of the destruction matrix (52). This void space (54) will preferably be present regardless of whether the flow pattern is top to bottom or bottom to top to allow for any expansion of the heat resistant material (51) contained in the destruction matrix (52).

The present invention can work equally as well whether the fume flow is directed top to bottom or bottom to top. The only difference in the two scenarios is a minimal effect that the buoyancy characteristics of the gases may have.

It is also preferable to have a matrix retention mechanism (58) present to contain the matrix material (51) and any plenum balls (56) within the afterburner chamber (46) such that they do not enter piping below the afterburner through port (50). Finally, the afterburner (30) will typically have one or more temperature sensors (60). These temperature sensors (60) allow monitoring of the system to ensure adequate temperature for operation, and for the sensing of thermal breakthrough, if it should occur.

Thus, the basics of the preferred embodiments of the apparatus of the present invention have been disclosed. Many variations on, and additions to, these basic embodiments are also possible.

In accordance with the present invention, under nominal flow conditions, the fume flow stream (22) is continuously routed to the oxidizer (24) for VOC destruction. The hot exhaust stream (28) from the oxidizer (24) serves to preheat the afterburner destruction matrix (52) and then maintain the afterburner destruction matrix temperature at a level suitable for VOC destruction. Thus, the hot exhaust gases from the oxidizer (24) keep the afterchamber (46) in a hot ready-idle mode for high flow processing by virtue of the large thermal mass resident in the afterchamber (46).

Under overflow or increased flow conditions, the nominal fume flow is still routed through the upstream oxidizer (24), but the excess flow beyond the nominal amount is bypassed directly to the afterburner (30) via bypass (32) through use of control valve (34). The afterburner (30) is designed to allow for sufficient fume residence time given the temperature of the matrix (52) for the complete oxidation of the bypassed fume stream.

In the unlikely event that total fume flow exceeds the maximum design flow, or the total heat value exceeds a specified maximum, the system control system (35) will make use of the emergency vent (26) to the atmosphere. This emergency vent would typically only be used during catastrophic events.

Upon entering the afterburner (30), the VOC emissions will be raised to oxidation temperatures of 1400°–3500° F. (760°–1925° C.), and preferably 1550–°1800° F. (845°–980° C.), by the heat from the matrix materials (51). The VOC emissions are then maintained at these temperatures for a sufficient residence time to ensure substantially complete destruction. In normal operation, it is contemplated that this residence time will be less than 2.0 seconds, and preferably less than 0.5 seconds.

The result of this heating is the creation of a flameless combustion wave within the destruction matrix (52) whereby the VOC compounds are ignited and oxidized to stable products, such as water and carbon dioxide. The combustion wave is observed as a steep increase in bed temperature from mixture inlet temperature on the inlet side of the wave to approximately the adiabatic combustion temperature of the mixture on the outlet side of the wave. This rapid change takes place over a distance of usually several inches in a typical afterburner, with the actual distance being dependent upon feed concentrations, feed rates, gas velocity distribution, bed material, bed physical properties, type of specific feed materials, etc. Heat losses in the direction of flow also will have an effect on the length of the combustion wave.

The temperature of the combustion is dependent upon feed concentrations, feed rates, gas velocity distribution, bed physical properties, type of specific feed materials, heat losses, and other factors.

While the bypass fume flow is being oxidized in the afterburner (30), the nominal flow of hot exhaust continues to flow into the afterburner (30) as well, donating additional heat to the destruction matrix (52). Because the VOC's in the hot stream from the oxidizer (24) are already oxidized, the afterburner (30) has little affect on this hot stream other than to remove some of its heat value. According to the present invention, the VOC's are also heated by heat generated by the reaction within the destruction matrix (52) itself, further increasing the completeness of the reaction.

When the fume flow tails off to the nominal flow again, the bypass shunt to the afterburner (30) is discontinued by closing control valve (34) and all flow is directed through the primary thermal oxidizer (24) again. The hot exhaust (28) from the primary thermal oxidizer (24) then replenishes the heat storage of the afterburner (30) and the destruction matrix (52).

It is also a possibility that the entire fume flow can be bypassed directly to the afterburner (30) for periods of time, depending upon the process involved.

The control system would consist of the one or more thermocouples or other temperature sensing devices (60) inserted into the afterchamber (46) that could allow sequencing by the primary control device (35). Sequencing would depend upon events such as the detection of: completion of afterburner preheat; if afterburner temperature is sufficient to allow destruction (thereby allowing the admission of bypass or excess flow); if temperature is insufficient to allow destruction (to shut the afterburner flow down and open the emergency vent (26)); or if afterburner temperature was so high as to pose the threat of damage to the afterburner or to the downstream equipment.

To further assist in even distribution of any overload fumes throughout the destruction matrix (52), a number of options may be used. FIG. 2 illustrates two ports (48) and (49). Port (48) could be used for a combined stream made up of the hot exhaust stream from the oxidizer (24) combined with any excess flow coming from the bypass (32). It is also possible to have two or more separate inlets to the chamber itself, for example using port (49) for bypass flow. Whichever method is used, it is preferable to allow for some mixing prior to passing the combined stream into the destruction matrix (52). Such a mixing zone would typically consist of a restriction between the upstream processor and the downstream afterburner (in order to facilitate mixing). Other variations might include injecting fumes through the use of an internal alloy distributor located within the duct (28) itself, or within the inlet region of the matrix bed (52), or the addition of mixing vanes or turbulence inducers included in the duct.

For maximum cost effectiveness, the afterburner (30) is sized to process the overflow condition for a limited duration only. This allows for the use of a small afterchamber (46). This also means that afterburner (30) will not be in equilibrium operation while processing the overflow condition. Its heat content will be continuously depleted and will require thermal replenishment from the upstream thermal oxidizer's hot exhaust once nominal flow is once again established.

FIGS. 3 and 4 are graphs illustrating how a design consideration, such as the type of matrix materials used, affects the necessary axial length of the destruction matrix (52). In FIG. 3, data is presented for the initial heat up of a cylindrical afterburner having a 36 inch diameter using a 1600° F. gas stream flowed at 500 standard cubic feet per minute (scfm), depending upon whether one inch ceramic saddles or 0.75 inch ceramic balls are used to form the matrix (52). The plotted lines indicate time/distance relationships for a 1450° F. temperature, a typically desired temperature to achieve destruction of VOC's, using the two matrix materials. It is seen that it takes significantly longer to heat up the matrix using smaller ceramic balls than the matrix with the ceramic saddles.

FIG. 4 illustrates a converse situation when a similar destruction matrix (52) is being used to destroy fumes. In this Figure, the fume flow rate has been increased to 1500 scfm to simulate the idea that the afterburner (30) will be used to destroy significant overflow streams while only the smaller nominal flow will be used for heat up. Figures of the type illustrated in FIG. 4 can be used to determine what size of afterburner is necessary for optimal operation of the system. For example, looking at FIG. 4, if an afterburner of 36 inch diameter is to be used, and the maximum time period of 1500 scfm overflow that will be experienced by the system in operation is 5 minutes, then a system using one inch ceramic saddles would need to have an afterburner that is at least about 42 inches long, while a system using 0.75 inch ceramic balls would only need to be 15 inches long, to ensure that at least a portion of the afterburner remains at a temperature of at least 1450° F.

It is generally considered that systems in accordance with the present invention will be designed such that they can operate at maximum fume flow for a period of time longer than the maximum expected length of such maximum flow. In many systems, this means a period of 0.1–24 hours.

It should be noted that the present inventive afterburner differs from the thermal matrix discussed in the incorporated by reference patents in at least one respect. In a typical porous matrix, the optimum matrix configuration has a high void fraction while maintaining the proper back-radiative and forced convective heat transfer characteristics of the matrix, which serves to minimize the cross-sectional area of the matrix required. In the afterburner application, however, the primary objective is to maximize the thermal mass while minimizing the pressure drop across the unit. This can result in the selection of a different matrix material (51) than that used in the upstream thermal oxidizer, if the upstream oxidizer makes use of a thermal matrix as well.

The units described above may be used without additional components for streams containing hydrocarbons, oxygenated hydrocarbons, or ppmv levels of nitrogen-, sulphur-, or halogen-containing hydrocarbons. The flameless afterburner (30) also can effectively destroy nitrogenated, sulphonated, and halogenated compounds in higher concentrations, but an installed system may require post-treatment (such as use of the scrubber (40)) to remove such products as HCl or $SO_2$.

There are several other considerations when designing a system in accordance with the present invention. For example, it is critical to examine the ducting heat losses between the thermal oxidizer (24) and the afterburner (30), as well as the afterchamber wall heat losses and the heat being supplied by the thermal oxidizer's exhaust (28) to make sure that sufficient heat will remain in the oxidizer exhaust (28) to heat the afterchamber (46) to operating temperature. In this regard, the afterburner (30) may be located in any relative position to the oxidizer (26) without compromising design efficiency so long as transient and steady-state heat losses are taken into account. Ideally, for these purposes, the afterburner (30) would be arranged in a co-annular fashion surrounding the upstream oxidizer (24) so as to minimize heat losses from the oxidizer (24), thereby allowing for the smallest possible system. However, the most practical configuration may be to abut the afterburner (30) up to the end of the oxidizer (24), so that, at least, no heat will be lost in the interconnecting ducting.

The afterburner (30) can be located directly below the upstream thermal oxidizer (24), as in FIG. 2, with almost no ducting run in between. The only ducting will then consist of short run from the bottom of the thermal oxidizer (24) to the top of the afterburner (30).

If the afterburner (30) is directly above, or above and slightly to the side of, the upstream thermal oxidizer (24), there can still be very little ducting in between. The ducting will consist of a short run from the top, or top of the side, of thermal oxidizer (24) to the bottom, or bottom of the side, of afterburner (30). Similarly, when the afterburner (30) is alongside the thermal oxidizer (24), the ducting will consist of a short run from the top of the side of thermal oxidizer (24) to the top of the side of the afterburner (30). Finally, if the afterburner (30) is alongside the thermal oxidizer (24), ducting will consist of slightly longer run from the top of the thermal oxidizer (24) to the top of the afterburner (30).

The pressure drop and heat storage characteristics of the matrix material need to be examined to make sure that maximum heat storage is achieved for minimum pressure drop. It is also important to ensure even distribution of both the preheat/nominal flow and the overflow fumes into the afterburner (30). If the system is configured in such a manner as to effectively short circuit the flow path through the destruction matrix (52), it will effectively reduce the amount of thermal mass being utilized in the process.

Additionally, it is necessary to ensure that the design of the afterburner (30) is such that it allows for adequate residence time of the VOC emissions at temperature in the afterburner to achieve maximum destruction.

A cyclical fume stream with little inherent heat content could cause a sinusoidal thermal profile in the afterchamber with a characteristic of "waves" of heat passing through the system. This operating characteristic would need to be recognized in order to prevent a control system's shutdown of the system under low operating temperature when, in actuality, the control system was detecting only the passing of one heat wave with plenty of destruction matrix bed still remaining at temperature to assure adequate oxidation.

Another design consideration is to allow for thermal expansion forces between the upstream oxidizer (24) and the downstream afterburner (30) so as to prevent damage to the thermal oxidizer exhaust port or to the afterburner entrance port.

The matrix bed cross-section perpendicular to the flow axis may be configured in a circular, square, rectangular, or other geometry. The area of the cross-section may be intentionally varied (i.e., as a truncated cone or truncated pyramid) to achieve a wide stable range of reactant volumetric flow rates at each given matrix burning velocity.

Because the present invention typically operates at temperatures (1550°–1850° F.) significantly below those present in standard combustors (about 3500° F.), there is less production of the undesirable $NO_x$ by-products.

Further, the burning velocity of the reactant gases in the matrix has been observed to be as much as 2 to 10 times greater than the fastest known laminar flame speed in free air.

The present invention has been described in terms of several preferred embodiments. However, the invention is not limited to the embodiments depicted and described, but can have many variations within the spirit of the invention. For instance, a preheating mechanism (such as an electric or fuel-fired heater) could be used to preheat the destruction matrix (52) prior to bringing the system on-line. This would allow for the system to immediately accommodate any fume flow exceeding nominal flow.

Accordingly, the scope of the invention should be determined not by the embodiments illustrated, but rather by the appended claims and their legal equivalents. Having thus described the invention, what is desired to be protected by Letters Patent is presented by the following appended claims.

What is claimed is:

1. A method for abating VOC emissions from a gas stream containing variable amounts of VOC emissions comprising the steps of:
    (a) feeding a nominal flow of the gas stream through an oxidizer whereby VOC's within the nominal flow are thermally oxidized into hot gaseous products;
    (b) directing the gaseous products to an afterburner having a matrix bed of heat resistant material at a temperature exceeding the combustion temperature of the VOC emissions whereby the hot gaseous products pass through the matrix bed and transfer heat to the heat resistant material;
    (c) bypassing any portion of the gas stream containing VOC emissions that exceeds the nominal flow to the afterburner without passing it through the oxidizer;
    (d) feeding the bypassed gas stream portion through the matrix bed of the afterburner, whereby VOC's in the bypassed gas stream portion are combusted into additional gaseous products in a combustion wave at oxidation temperatures of from 1400° F. to 3500° F.; and
    (e) directing such gaseous products and additional gaseous products to an afterburner outlet.

2. The method of claim 1 further comprising the step of removing liquids from the gas stream prior to feeding the gas stream through the oxidizer or afterburner.

3. The method of claim 1 including the further step of preheating the matrix bed using the heat transferred from the nominal flow of gaseous products prior to feeding any bypass stream to the afterburner.

4. The method of claim 1 comprising the further steps of monitoring the temperature of the matrix bed and controlling the amount of the gas stream that is bypassed in response thereto.

5. The method of claim 1 wherein the matrix bed of heat resistant material in the afterburner comprises ceramic balls, ceramic saddles, ceramic pall rings, ceramic rashig rings, ceramic foam, or ceramic wool.

6. The method of claim 1 wherein the oxidizer contains a matrix bed of porous, inert, heat resistant material.

7. The method of claim 6 wherein the VOC's within the nominal flow are thermally oxidized at temperatures between 1400° F. and 3500° F. within the oxidizer.

8. The method of claim 7 wherein the matrix bed of heat resistant material in the afterburner comprises ceramic balls, ceramic saddles, ceramic pall rings, ceramic rashig rings, ceramic foam, or ceramic wool.

9. A method for abating VOC emissions from a gas stream containing variable amounts of VOC emissions comprising the steps of:
    (a) feeding a nominal flow of the gas stream through an oxidizer whereby VOC's within the nominal flow are thermally oxidized into hot gaseous products;
    (b) directing the gaseous products to an afterburner having a matrix bed of heat resistant material at a temperature exceeding the combustion temperature of the VOC emissions whereby the hot gaseous products pass through the matrix bed and transfer heat to the heat resistant material;
    (c) once the temperature of the matrix bed exceeds the combustion temperature of the VOC's, and when the flow rate of the gas stream exceeds the nominal flow for the oxidizer, bypassing the excess portion of the gas stream beyond the nominal flow value to the afterburner without passing it through the oxidizer;
    (d) feeding the bypassed gas stream portion through the matrix bed of the afterburner, whereby VOC's in the bypassed gas stream portion are combusted into additional gaseous products in a combustion wave;
    (e) monitoring the temperature of the matrix bed and controlling the amount of the gas stream that is bypassed in response thereto in order to maintain the temperature between about 1400° F. and about 3500° F. in the combustion wave; and (f) directing such gaseous products and additional gaseous products to an afterburner outlet.

10. The method of claim 9 wherein the matrix bed of heat resistant material in the afterburner comprises ceramic balls, ceramic saddles, ceramic pall rings, ceramic rashig rings, ceramic foam, or ceramic wool.

11. The method of claim 9 wherein the oxidizer contains a matrix bed of porous, inert, heat resistant material.

12. The method of claim 11 wherein the VOC's within the nominal flow are thermally oxidized at temperatures between 1400° F. and 3500° F. within the oxidizer.

13. The method of claim 12 wherein the matrix bed of heat resistant material in the afterburner comprises ceramic balls, ceramic saddles, ceramic pall rings, ceramic rashig rings, ceramic foam, or ceramic wool.

14. A method for abating VOC emissions from a gas stream containing variable amounts of VOC emissions comprising the steps of:

(a) feeding a nominal flow of the gas stream through an oxidizer whereby VOC's within the nominal flow are thermally oxidized into hot gaseous products;

(b) directing the gaseous products to an afterburner having a matrix bed of heat resistant material at a temperature exceeding the combustion temperature of the VOC emissions whereby the hot gaseous products pass through the matrix bed and transfer heat to the heat resistant material;

(c) subsequently bypassing, when the flow rate of the gas stream containing VOC emissions exceeds the nominal flow rate, at least a portion of the gas stream containing VOC emissions to the afterburner without passing said portion through the oxidizer;

(d) feeding the bypassed gas stream portion through the matrix bed of the afterburner, whereby VOC's in the bypassed gas stream portion are combusted into additional gaseous products in a combustion wave at oxidation temperatures of from 1400° F. to 3500° F.; and (e) directing such gaseous products and additional gaseous products to an afterburner outlet.

15. The method of claim 14 wherein the matrix bed of heat resistant material in the afterburner comprises ceramic balls, ceramic saddles, ceramic pall rings, ceramic rashig rings, ceramic foam, or ceramic wool.

16. The method of claim 14 wherein the oxidizer contains a matrix bed of porous, inert, heat resistant material.

17. The method of claim 16 wherein the VOC's within the nominal flow are thermally oxidized at temperatures between 1400° F. and 3500° F. within the oxidizer.

18. The method of claim 17 wherein the matrix bed of heat resistant material in the afterburner comprises ceramic balls, ceramic saddles, ceramic pall rings, ceramic rashig rings, ceramic foam, or ceramic wool.

19. The method of claim 14 further comprising bypassing the entire portion of the gas stream containing VOC emissions during the bypassing step.

* * * * *